United States Patent
Kretsch

(10) Patent No.: US 6,438,227 B1
(45) Date of Patent: Aug. 20, 2002

(54) MECHANICAL ACOUSTIC FILTER WITH ADJUSTABLE HIGH-FREQUENCY CUT-OFF

(75) Inventor: Mark Kretsch, Carlsbad, CA (US)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/412,238

(22) Filed: Oct. 5, 1999

(51) Int. Cl.[7] .................................................. H04M 1/00
(52) U.S. Cl. ........................................................ 379/433.02
(58) Field of Search ........................................ 379/433, 428, 379/433.02; 181/138; 455/575, 90

(56) References Cited

U.S. PATENT DOCUMENTS 5,729,605 A * 3/1998 Bobisuthi et al. ........... 379/433

* cited by examiner

*Primary Examiner*—Jack Chiang
(74) *Attorney, Agent, or Firm*—Fish & Richardson P.C.

(57) ABSTRACT

A mechanically adjustable acoustic filter for a telephone handset earpiece can be adjusted for users with normal hearing or for hearing-impaired users. The acoustic filter includes an enclosure and at least two plates within the enclosure. Each plate has a plurality of holes of a particular diameter. The two plates are capable of being displaced relative to each other, such that an aggregate size of the holes vary as the plates are displaced. The variations in the aggregate size of the holes changes the frequency response of the acoustic filter.

8 Claims, 7 Drawing Sheets

MECHANICAL ACOUSTIC FILTER WITH ADJUSTABLE HIGH-FREQUENCY CUT-OFF

BACKGROUND

This invention relates to an acoustic filter used in telephone handset earpieces.

A telephone handset earpiece often includes a speaker, a protective cover with apertures to couple sound to a phone user's ear, and an air-filled cavity between the speaker and the protective cover.

A phone user with normal hearing has no trouble hearing high frequency sounds but may have a problem with noise or hiss associated with the high frequency. A phone user with impaired hearing, on the other hand, often requires emphasis or amplification of high frequency components in audio signals.

SUMMARY

The system described herein obviates the above described problems by providing a mechanically adjustable acoustic filter for a telephone handset earpiece that can be adjusted for users with normal hearing or for hearing-impaired users.

In one aspect, the disclosure features a mechanical acoustic filter having an enclosure and at least two plates within the enclosure. Each plate has a plurality of holes of a particular diameter. The two plates are capable of being displaced relative to each other, such that an aggregate size of the holes vary as the plates are displaced. The variations in the aggregate size of the holes within the enclosure changes the frequency response of the acoustic filter.

In some embodiments, the plates are substantially circular in shape and are displaced relative to each other by rotating the plates about a fixed pivot point. In other embodiments, the plates are disposed parallel to each other and are substantially rectangular or square in shape. The plates are displaced relative to each other by sliding the plates along the parallel direction.

In another aspect, the disclosure features a telephone handset having a housing, a speaker and communication electronics disposed within the housing, and a mechanical acoustic filter disposed on top of the speaker.

Advantages of using a mechanical acoustic filter compared to a typical electronic filter for an adjustable high-frequency cut-off include lower cost and less maintenance.

DETAILED DESCRIPTION

Figure 1:
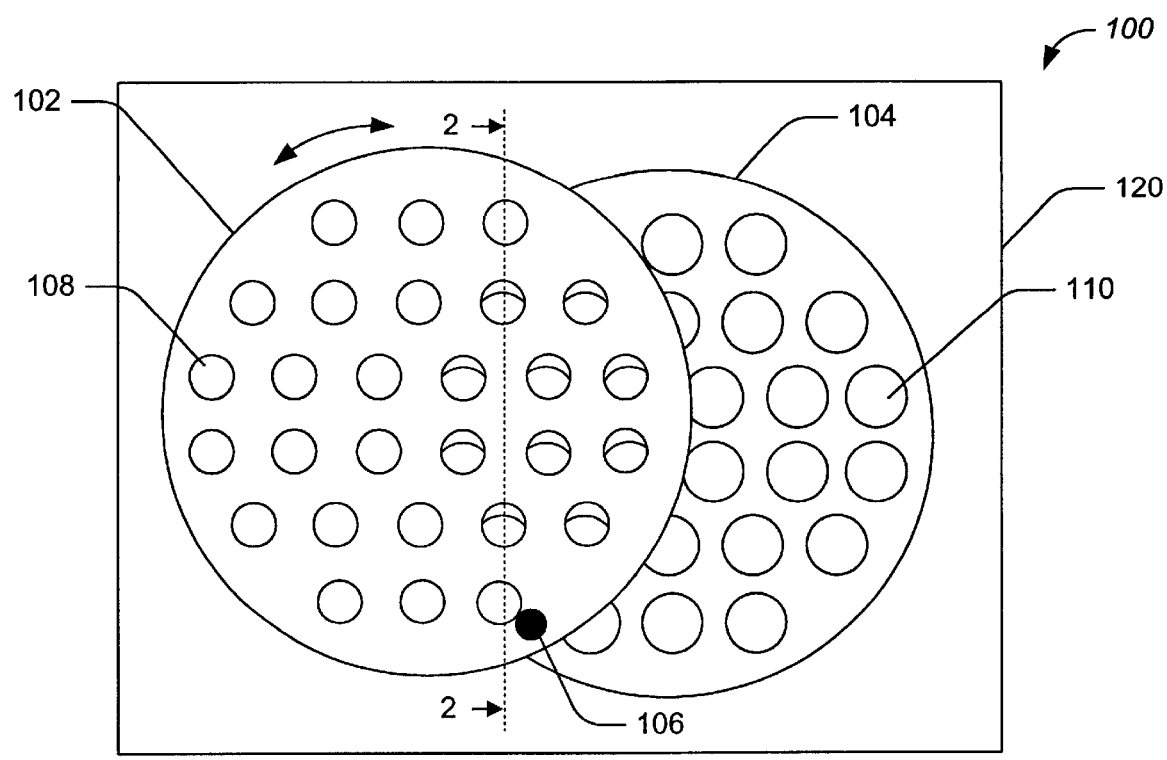
FIG. 1 shows an acoustic filter for a telephone handset earpiece.

FIG. 1 shows an acoustic filter 100 for a telephone handset earpiece. The acoustic filter 100 comprises at least two plates 102, 104 that are placed within an enclosure 120, and are pivotally rotatable at a pivot point 106. Each of the two plates 102, 104 has a plurality of holes 108, 110, with different size diameters 112 to vary the frequency response of the filter 100.

In many embodiments, the plates are substantially circular in shape, forming disk-like plates. In some embodiments, the plates 102, 104 are made of plastic material. In other embodiments, the plates 102, 104 are thin metallic disks.

The acoustic filter 100 attaches to a sound producing mechanism such as a speaker in any of a variety of ways. In one embodiment, the filter 100 is disposed adjacent to a speaker in an enclosure 120 and forms a resonator with a resonant frequency and a quality (Q) factor determined by an aggregate size of the holes on the plates. If the aggregate size of the holes is large, the Q factor of the resonator is low, which results in less audio attenuation at high frequencies near the resonant frequency. This is the preferred situation for the hearing-impaired users. On the other hand, if the aggregate size of the holes is small, the Q factor of the resonator is high, which results in substantial attenuation of the high frequency noise or hiss. This is the preferred situation for the normal hearing users.

Figure 2:
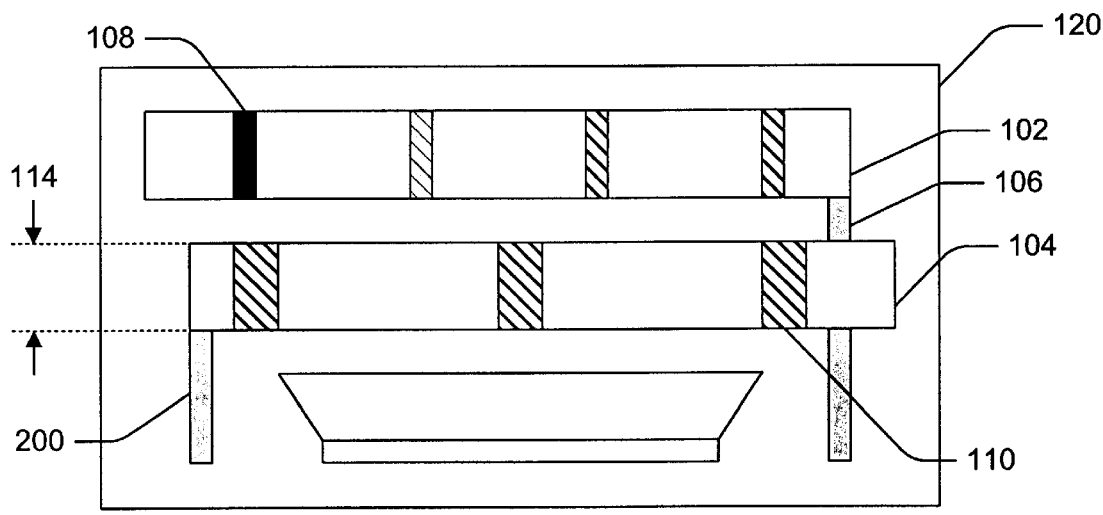
FIG. 2 is a side view of the acoustic filter cut along the line 2—2 in FIG. 1.

FIG. 2 is a side view of the acoustic filter 100 cut along the line 2—2 shown in FIG. 1. The filter 100 has plates 102, 104 that are rotatable about a pivot point 106. In one embodiment, both plates 102, 104 are rotatable. In another embodiment, a bottom plate 104 is fixed with a fixed support 200 and a top plate 102 is made rotatable.

Each plate 102, 104 has a specific thickness 114, which contributes to the determination of the resonant frequency. In particular, the ratio of the aggregate diameter to the thickness 114 determines the resonant frequency of the acoustic filter 100.

Figure 3:
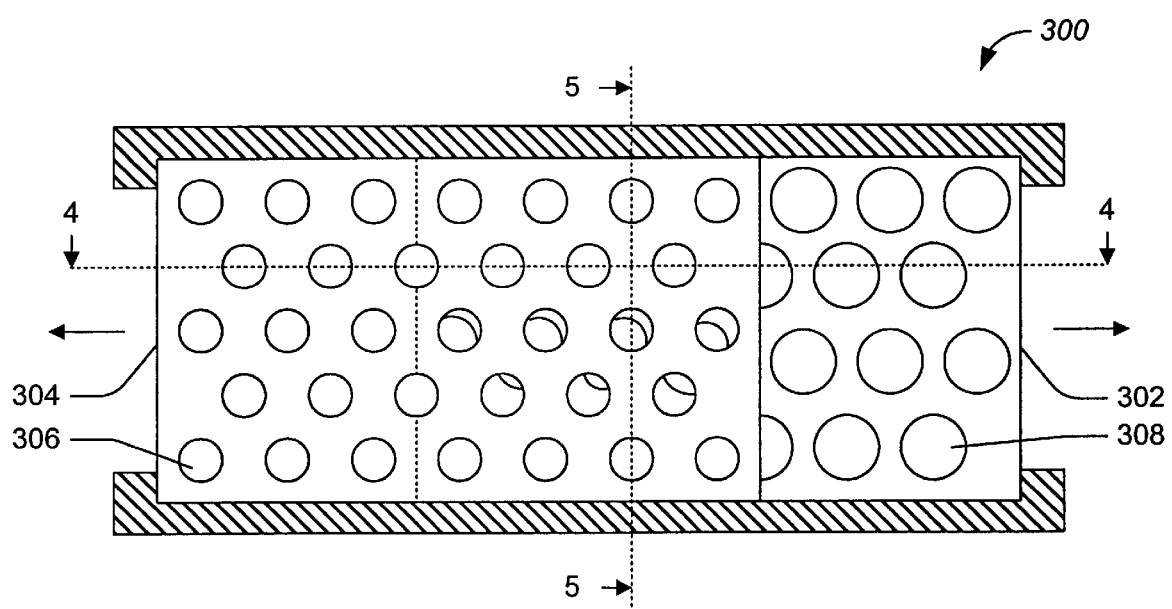
FIG. 3 shows an alternative embodiment of the acoustic filter.

An alternative embodiment of the acoustic filter 300 comprising two parallel plates each with a plurality of holes is shown in FIG. 3. The two plates 302, 304 with different diameter size holes 306, 308 are substantially rectangular or square in shape. The aggregate size of the holes is varied by sliding both or either of the disks 302, 304 along the parallel direction.

Figure 4:
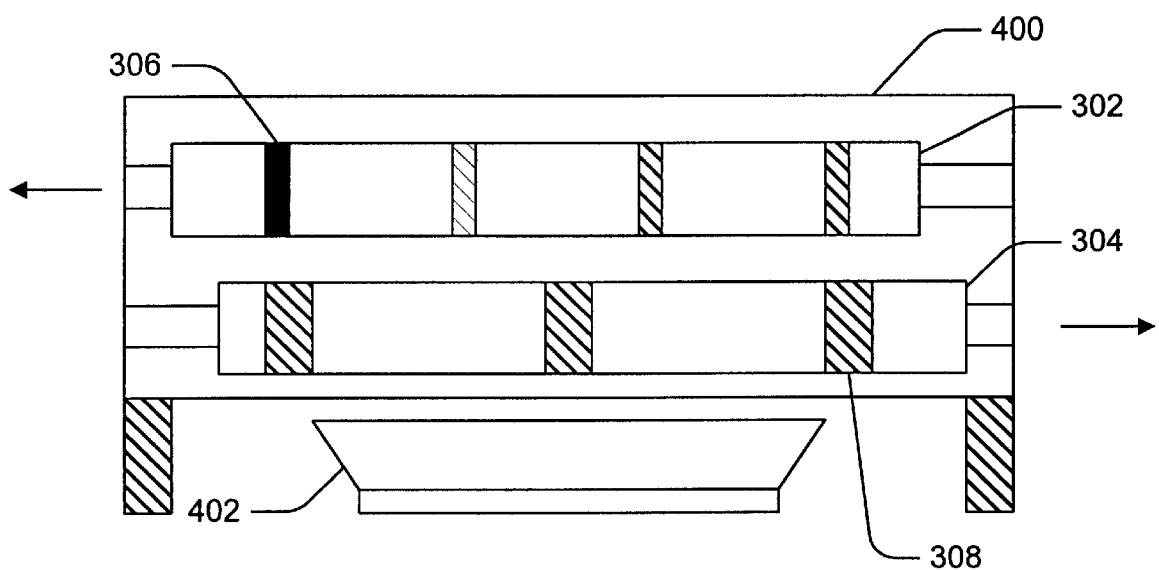
FIG. 4 is a side view of the acoustic filter cut along the line 4—4 in FIG. 3.

FIG. 4 is a side view of the acoustic filter 300 cut along the line 4—4 in FIG. 3. The plates 302, 304 are supported on top of a similarly shaped speaker, such as a substantially rectangular or square-shaped speaker 402, by grooved support brackets 400 on both sides of the speaker 402. The holes 306, 308 overlap each other to change the aggregate size of the holes in the acoustic filter 300.

Figure 5:
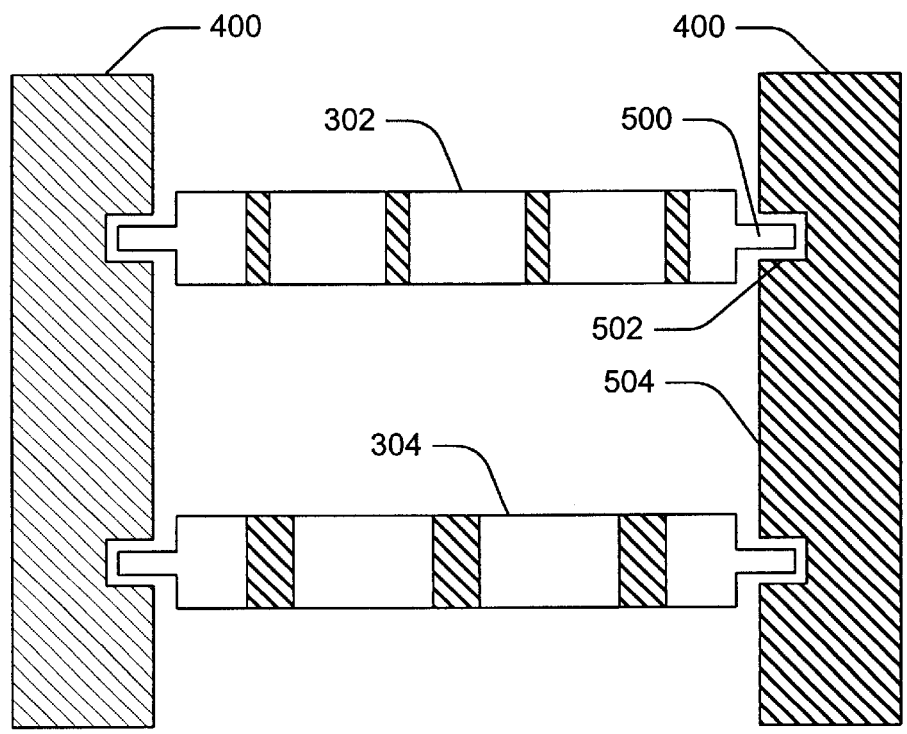
FIG. 5 is a side view of the acoustic filter cut along the line 5—5 in FIG. 3.

FIG. 5 illustrates a side view of the acoustic filter 300 cut along the line 5—5 in FIG. 3. The filter 300 includes the grooved support brackets 400 that enable the plates 302, 304 to slide along the directions shown in FIGS. 3 and 4. In one embodiment, ridges or riding pins 500 protrude from the edges of the plates 302, 304. The ridges or riding pins 500 ride on slide grooves 502 formed on the inner surfaces 504 of the support bracket 400. In an alternative embodiment, the edges of the plates 202, 204 are made thin and smooth to slide easily along the slide grooves 502.

Figure 6:
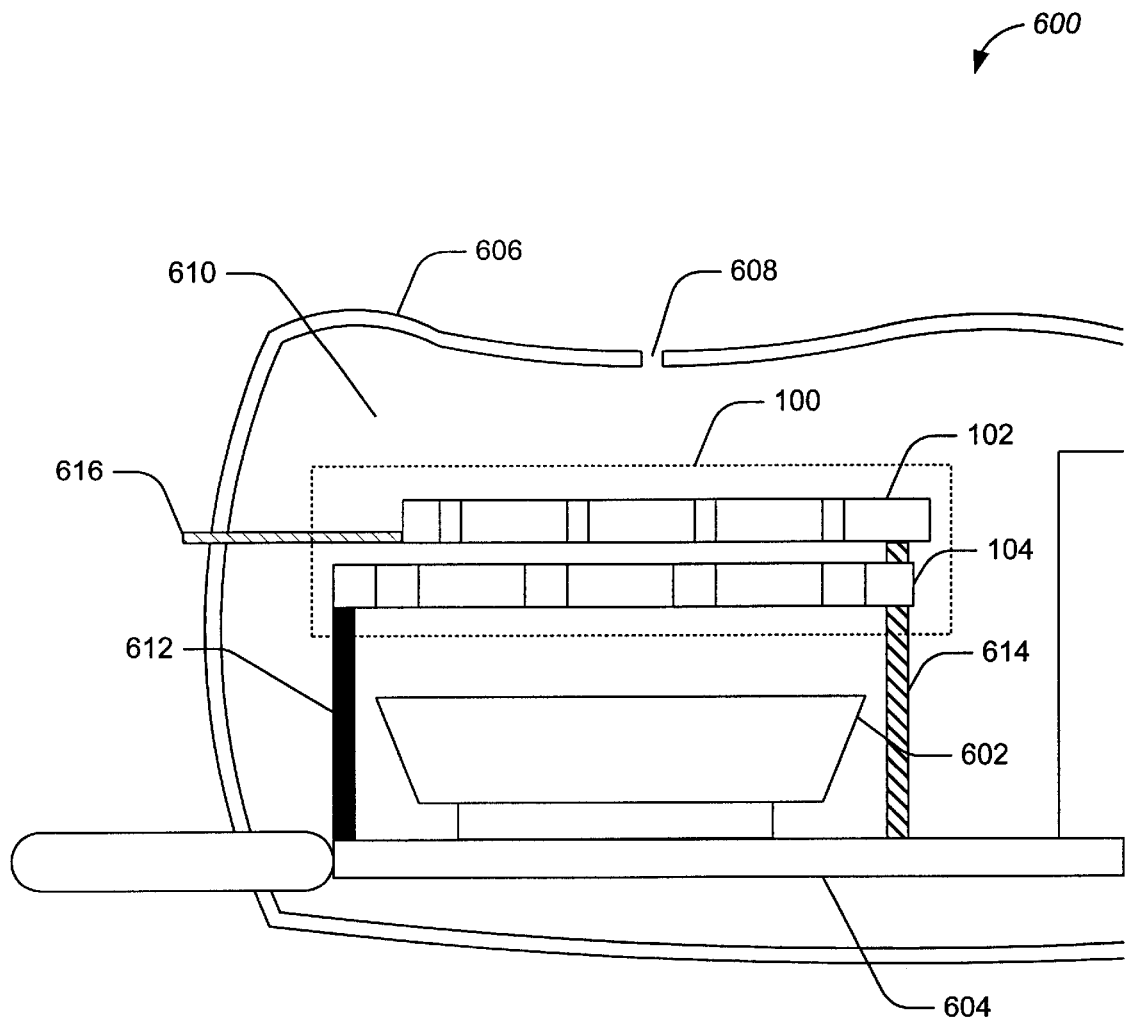
FIG. 6 is a side cut-away view of a telephone handset earpiece having an acoustic filter.

A side cut-away view of a telephone handset earpiece 600 having an acoustic filter 100 is shown in FIG. 6. The handset earpiece 600 includes a speaker 602 mounted on a printed circuit board 604, a protective housing 606 with an aperture 608 to couple sound to the outside, and an air-filled cavity 610 between the speaker 602 and the protective cover 606. The handset earpiece 600 also includes an acoustic filter 100 that is also mounted on the printed circuit board 604.

In some embodiments, the acoustic filter 100 is mounted above a speaker 602 with mounting supports 612, 614. The mounting support 614 attached to both plates 102, 104 is used as a rotating pivot. The other mounting support 612 is used to fix the bottom plate 104 in one position. In another embodiment, the filter 100 is mounted on a slidable mounting bracket (shown in FIGS. 3 through 5).

The acoustic filter's frequency response is adjustable by rotating the top plate 102 with a lever 616 located at the top of the protective cover 606.

Figure 7:
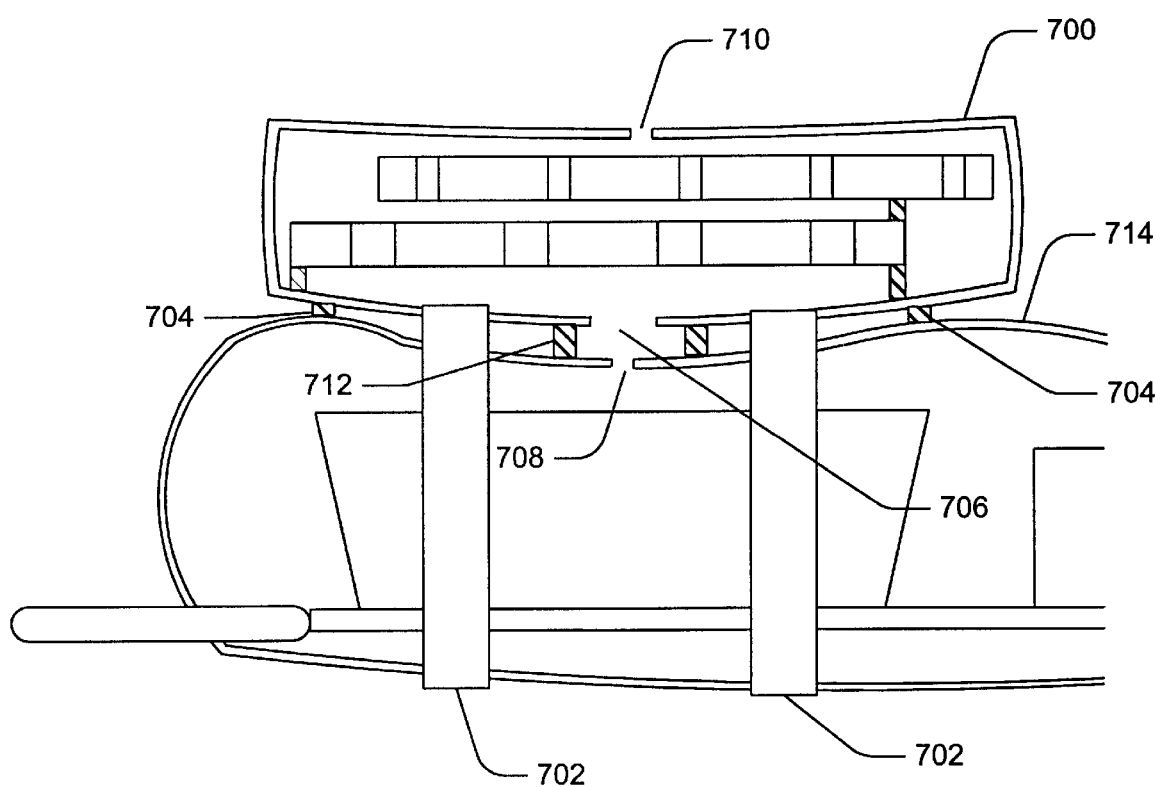
FIG. 7 shows an alternative embodiment of the acoustic filter for an existing telephone handset.

An alternative embodiment of the acoustic filter for an existing telephone handset is shown in FIG. 7. In an existing telephone handset, the acoustic filter can be attached to the earpiece and housed in an enclosure 700 separate from the telephone housing 714 to form a resonator.

In some embodiments, the enclosure 700 is securely attached to the handset by a fastening material 702, such as an elastic or rubber band. In other embodiments, the enclosure 700 is detachably attached by means of a fastening mechanism 704. Suitable fastening mechanisms include adhesive materials, such as VELCRO brand hook-and-loop fasteners or two-sided tape. Other mechanisms include lock posts that protrude from the filter enclosure 700 into corresponding receptacles in the telephone housing 714. The enclosure 700 can be gapped and stood-off by rubber feet 712 to prevent the enclosure 700 from sliding off and damaging the telephone housing 714.

The enclosure has a variable size aperture 706 to guide the unfiltered sound from the telephone handset into the acoustic filter enclosure 700. The unfiltered sound coming into the enclosure is filtered by the acoustic filter and exits through an opening 710 on top of the enclosure 700.

Figure 8:
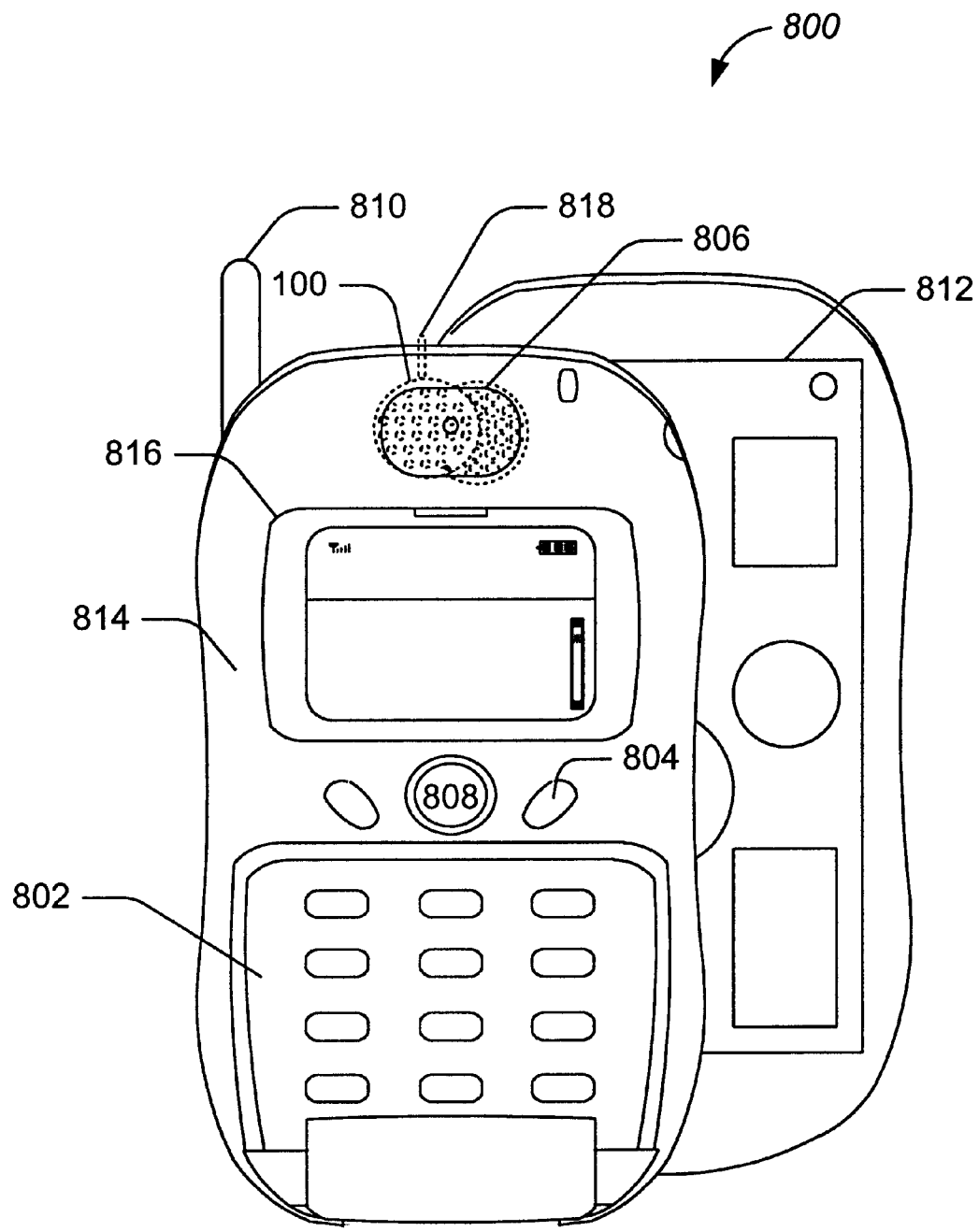
FIG. 8 is an exploded view of a telephone handset.

An exploded view of a telephone handset 800 using an acoustic filter 100 is shown in FIG. 8. A lever 818 is used to adjust the frequency response of the filter 100. The telephone handset 800 also includes a key pad 802, various other buttons and indicators 804, a speaker 806, a microphone 808, an antenna 810, and other phone electronics 812 contained within the telephone housing 814. A display unit 816 is used in conjunction with the keypad 802 to facilitate user inputs.

Figure 9:
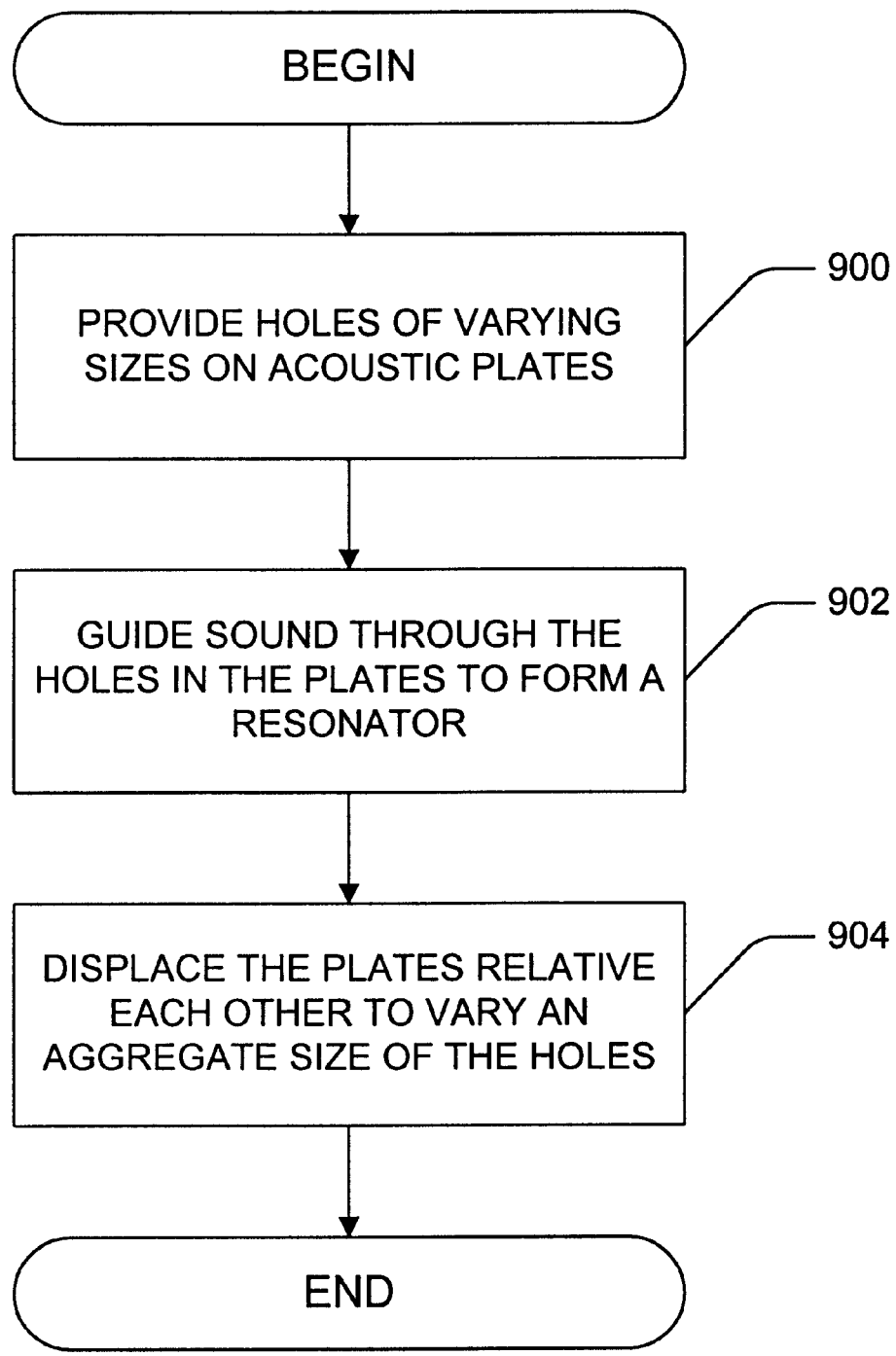
FIG. 9 shows a flow diagram for a process of mechanically adjusting the resonant frequency of an acoustic filter.

FIG. 9 shows a flow diagram for a process of mechanically adjusting the resonant frequency of an acoustic filter. Initially, holes of varying sizes are provided on a plurality of acoustic plates (step 900). A resonator is formed, at step 902, by guiding sound through the holes in the plates. At step 904, the plates are displaced relative to each other. The displacement varies an aggregate size of the holes on the plates to adjust the resonant frequency in the resonator.

In some embodiments, displacing the plurality of plates includes rotating the plates about a fixed pivot point. In other embodiments, displacing the plurality of plates includes placing the plates in a parallel configuration and sliding the plates in the parallel direction relative to each other.

Although only a few embodiments have been described in detail above, those of ordinary skill in the art certainly understand that modifications are possible. For example, the plates within the enclosure can be of any shape and size. Also, the holes on the plates can be of any shape and size. Further, the number of plates and holes can be varied. All such modifications are intended to be encompassed within the following claims, in which:

What is claimed is:

1. A mechanical acoustic filter comprising:

an enclosure; and two substantially circular plates within the enclosure, each plate having a center axis and a plurality of holes of a particular diameter, said two substantially circular plates capable of being displaced relative to each other about a fixed pivot point offset from the center axes of said two substantially circular plates such that an aggregate size of the plurality of holes varies as the plates are displaced, thereby changing a frequency response of the acoustic filter.

2. The filter of claim 1, wherein said particular diameter is different from diameters of other plates.

3. The filter of claim 1, wherein a top plate is displaced relative to the fixed bottom plate to vary the aggregate size of the holes.

4. The filter of claim 1, further comprising:

a sound source disposed adjacent to said two plates, such that the enclosure forms a resonator.

5. The filter of claim 4, wherein the sound source is a telephone handset earpiece.

6. The filter of claim 4, further comprising:

a fastening mechanism coupled to the acoustic filter to attach the filter to the sound source.

7. A method of mechanically adjusting a resonant frequency of an acoustic filter, comprising:

providing holes of varying sizes on a plurality of acoustic plates, each plate being substantially circular in shape and having a center axis;

guiding sound through the holes in the plurality of plates, thereby forming a resonator;

displacing the plurality of plates relative to each other, such that the displacement varies an aggregate size of the holes to adjust the resonant frequency in the resonator, wherein displacing the plurality of plates relative to each other comprises rotating one substantially circular plate relative to another substantially circular plate about a fixed pivot point offset from the center axes of the substantially circular plates.

8. A telephone handset comprising:

a housing;

a speaker disposed within the housing;

a mechanical acoustic filter disposed on top of the speaker, said acoustic filter having two substantially circular plates, each plate having a center axis and a plurality of holes of a particular diameter, said two substantially circular plates capable of being displaced relative to each other about a fixed pivot point offset from the center axes of the substantially circular plates such that an aggregate size of the plurality of holes varies as the plates are displaced, thereby changing a frequency response of the acoustic filter; and communication electronics disposed within the housing for sending and receiving audio signals.

* * * * *